Feb. 15, 1955  R. J. WEIKERT  2,701,893
APPARATUS FOR MAKING HAT COVERS
Filed Aug. 6, 1951  8 Sheets-Sheet 1
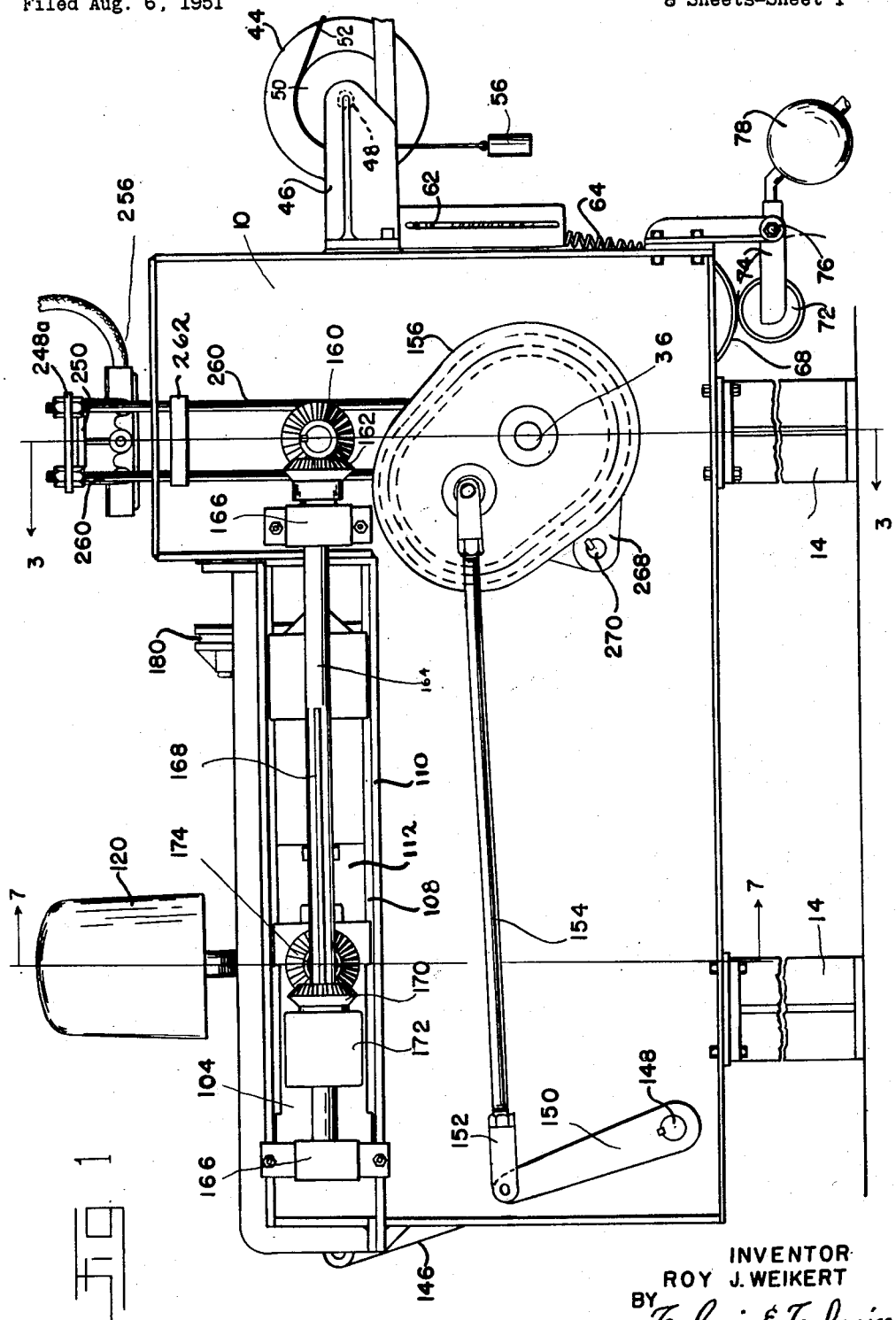
INVENTOR
ROY J. WEIKERT
BY
Toulmin & Toulmin
ATTORNEYS

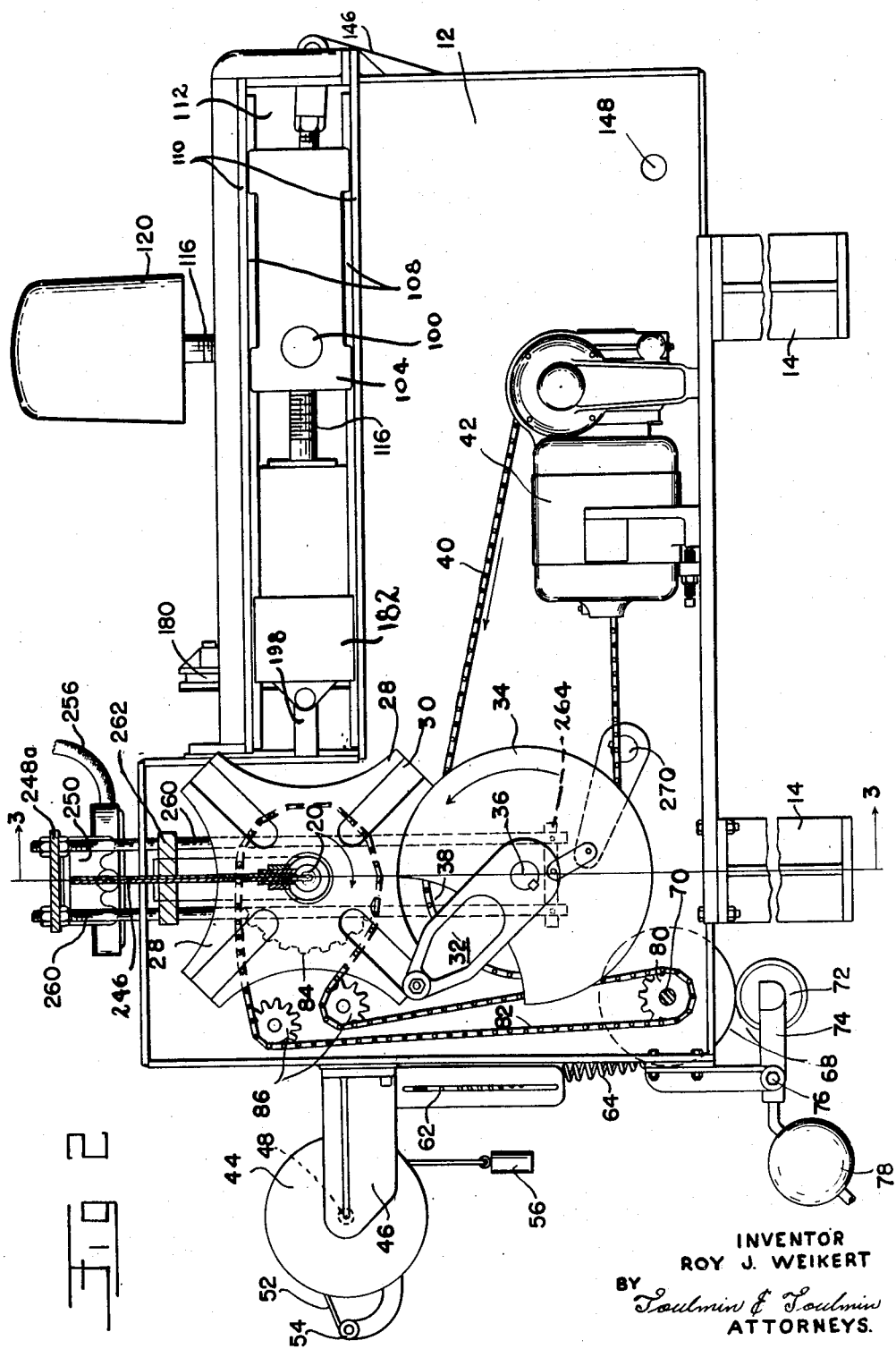

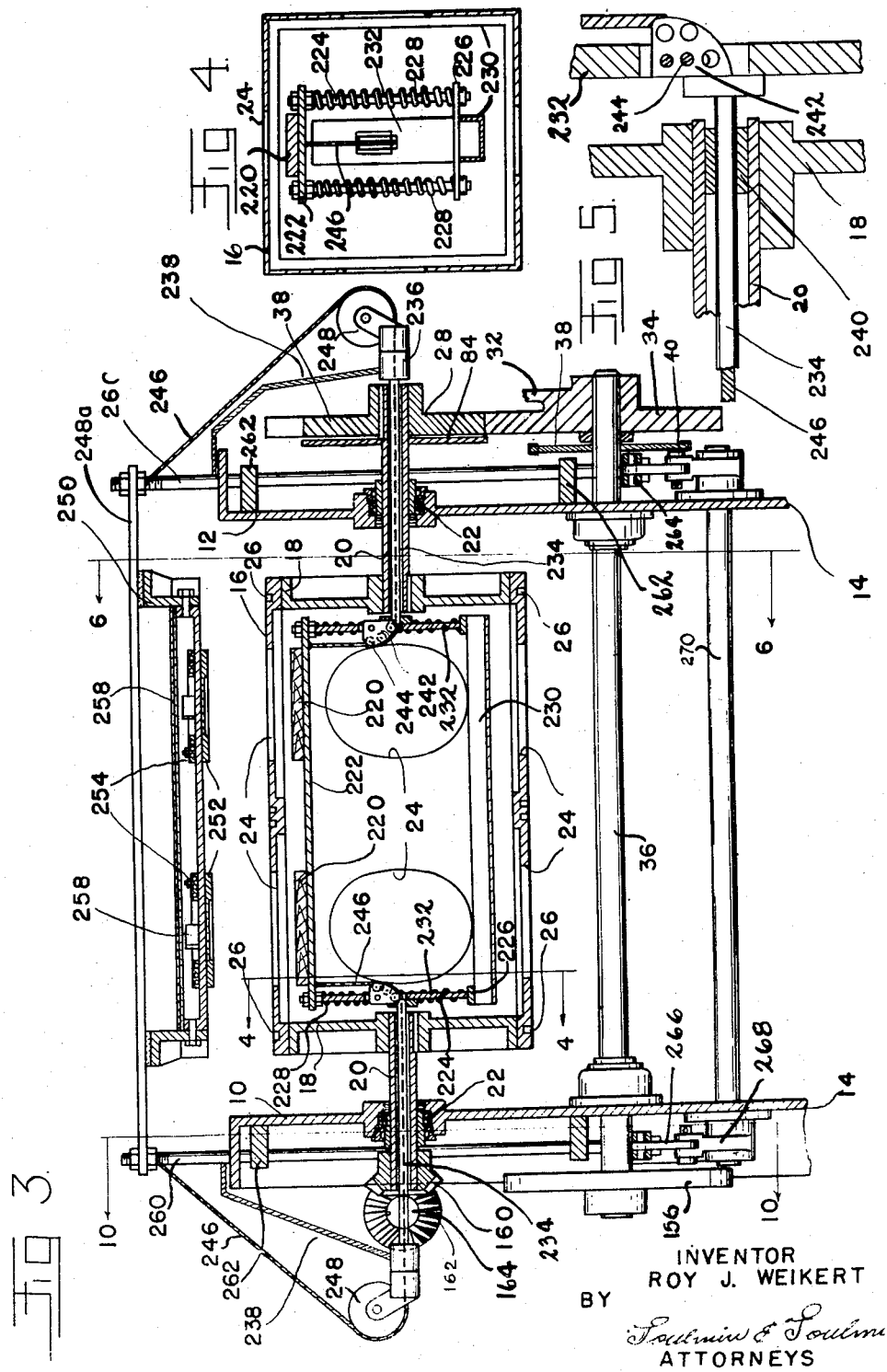

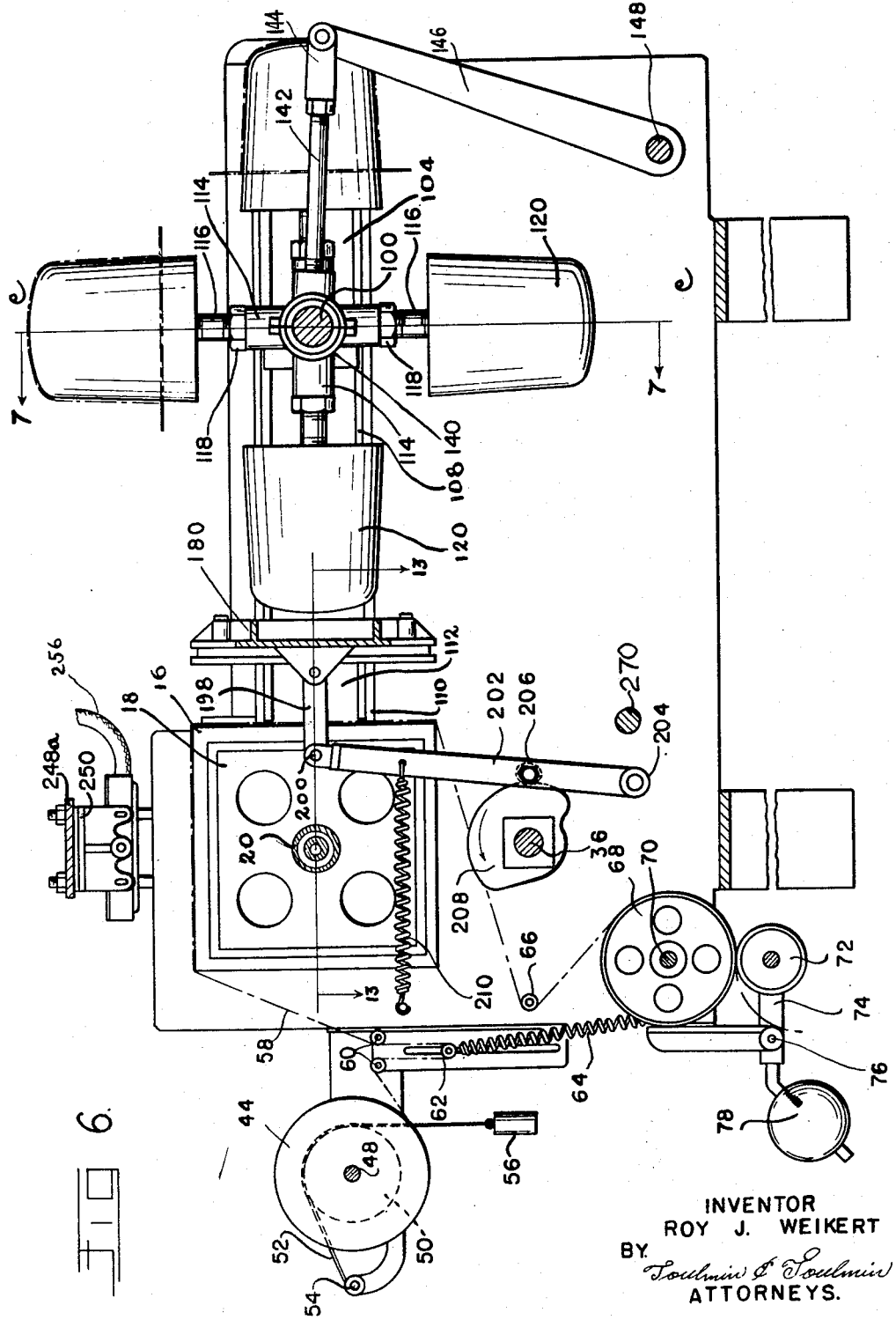

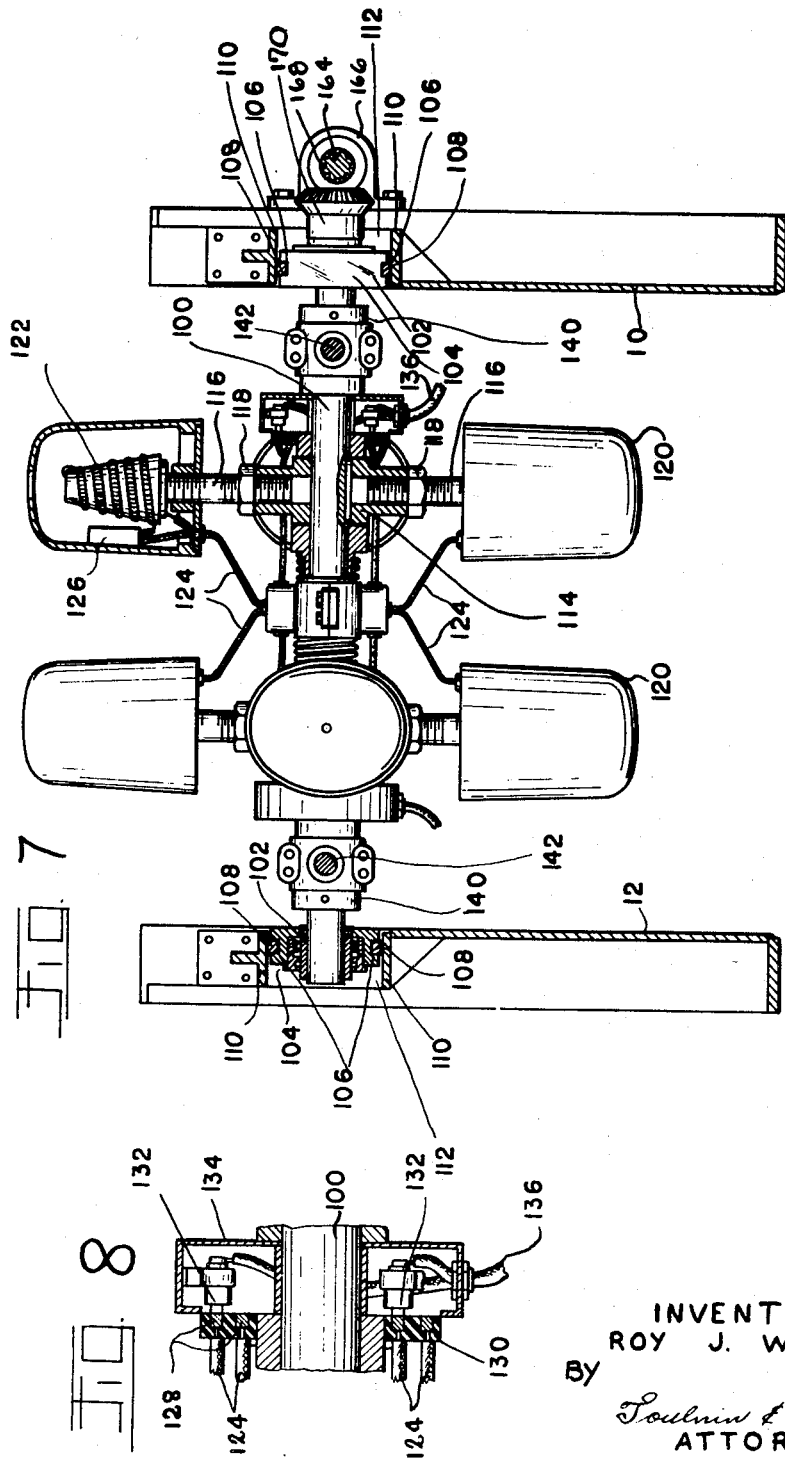

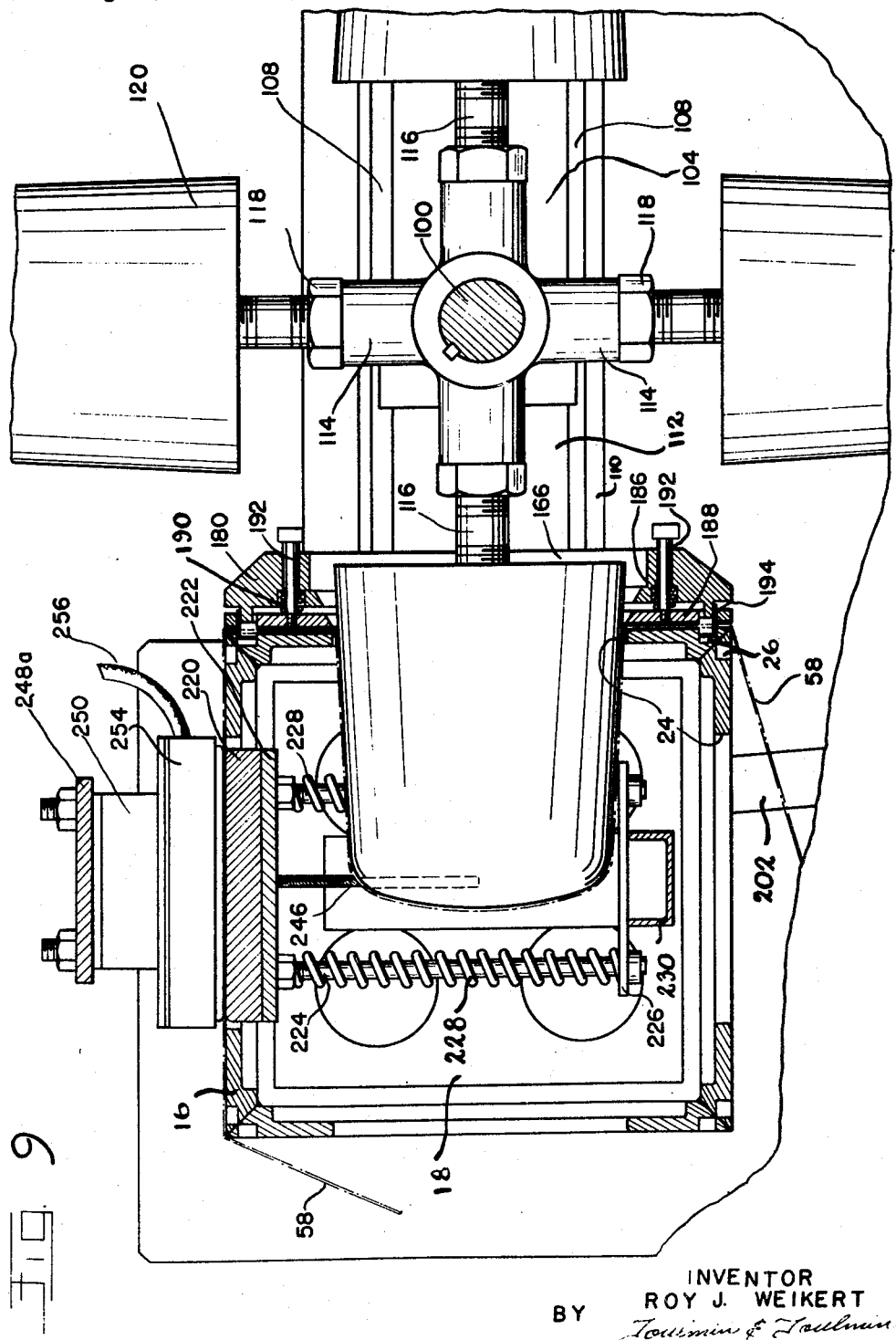

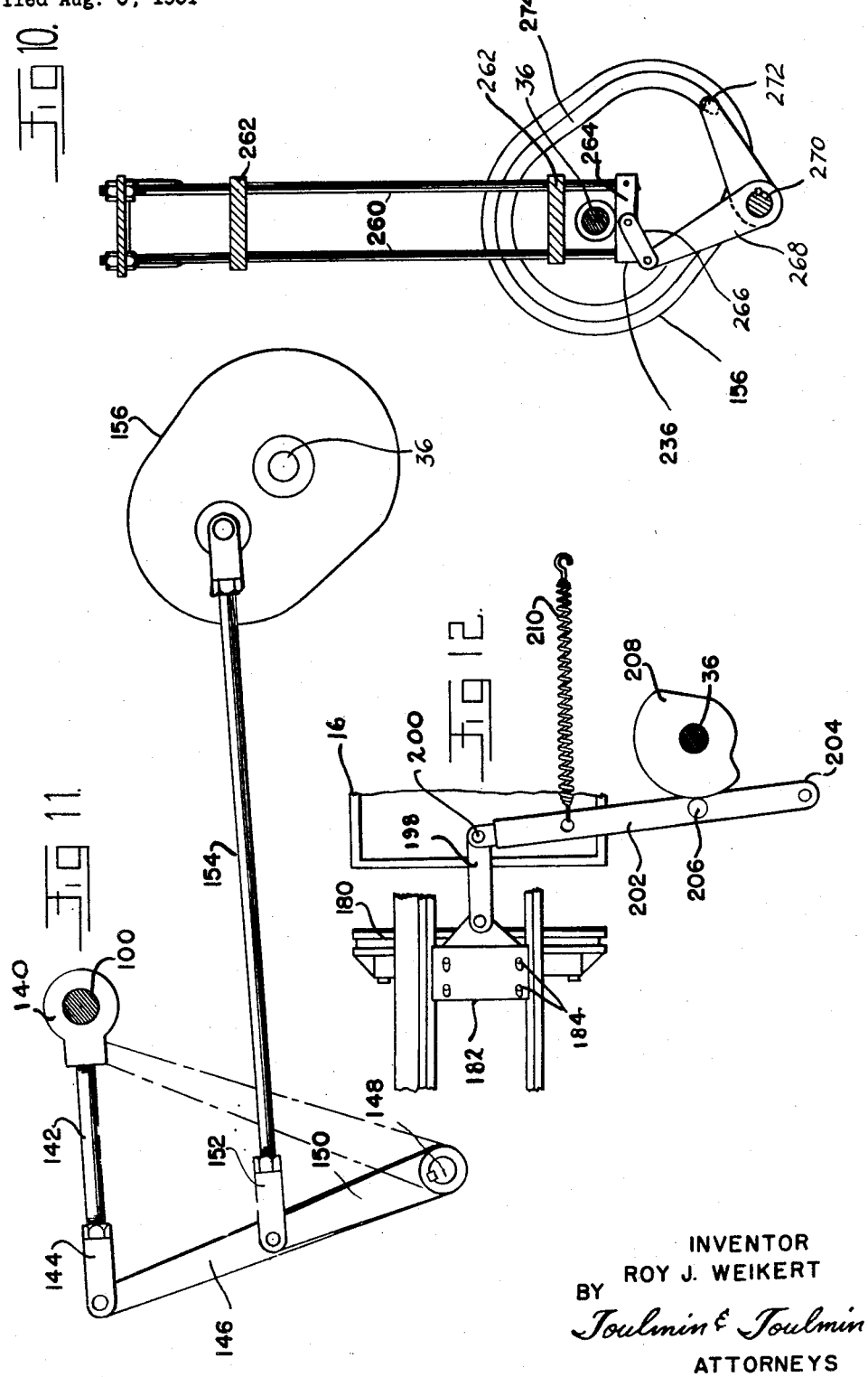

Feb. 15, 1955  R. J. WEIKERT  2,701,893
APPARATUS FOR MAKING HAT COVERS
Filed Aug. 6, 1951  8 Sheets-Sheet 8
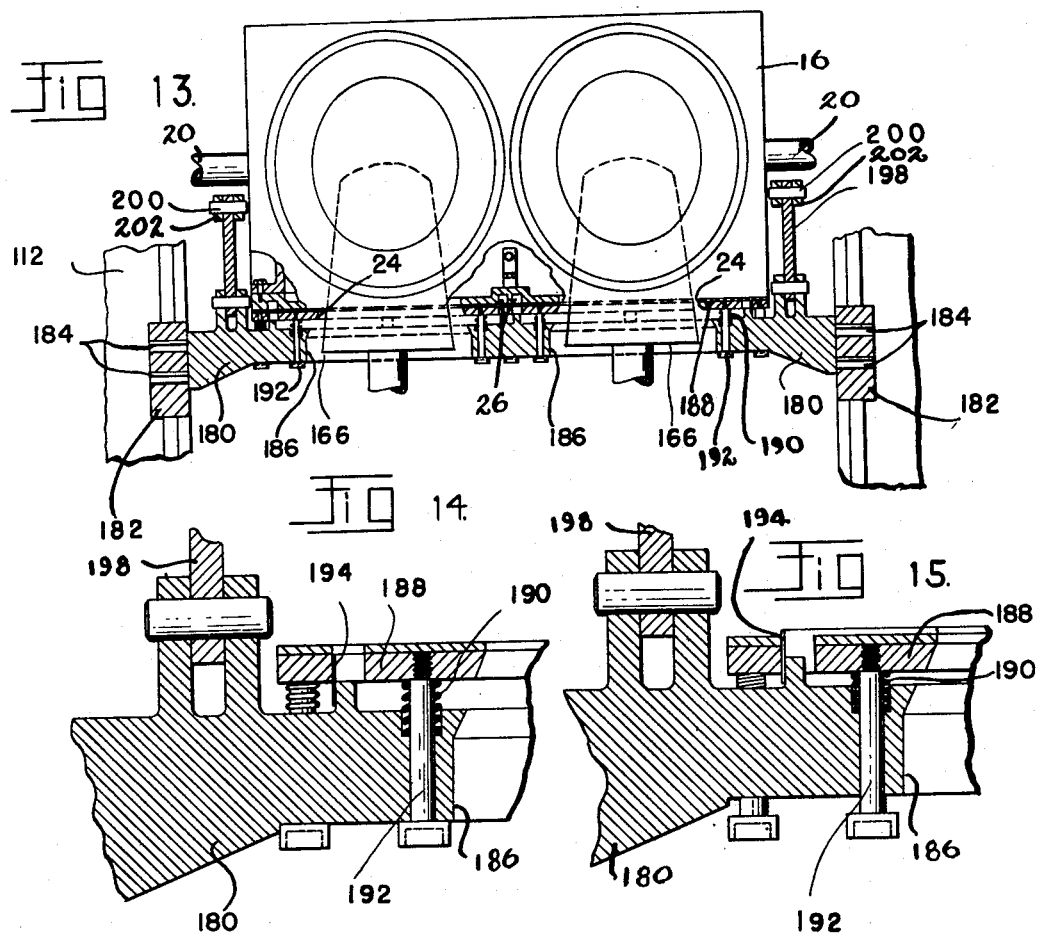
INVENTOR
ROY J. WEIKERT
BY
Toulmin & Toulmin
ATTORNEYS

United States Patent Office 2,701,893
Patented Feb. 15, 1955

2,701,893

APPARATUS FOR MAKING HAT COVERS

Roy J. Weikert, Covington, Ohio, assignor to Joseph Lincoln Manufacturing Company, Inc., Covington, Ohio, a company of Delaware Application August 6, 1951, Serial No. 240,584

4 Claims. (Cl. 18—19)

This invention relates to an apparatus for manufacturing articles of commerce from a heat softenable material, and particularly to an apparatus for the manufacture of protective hat covers.

Hat covers of the type with which this invention is concerned consist of a relatively thin film of a water-proof material shaped to the general contour of a hat.

The material ordinarily used for making these members is a chlorinated hydrocarbon, such as chlorinated rubber, and one of the most familiar in the trade is known as "Pliofilm." This material is capable of being formed into thin films which resist deterioration and dimensional change at ordinary temperatures, but which soften upon the application of heat, so that they can be formed, as by stretching, to the desired shape.

Articles of the nature referred to must necessarily be sold at a relatively small price and must, therefore, be produced rapidly and economically.

Having this in mind, the primary object of the present invention is the provision of an apparatus for forming hat covers or the like rapidly and economically.

A still further object is the provision of an apparatus for forming hat covers or the like which is entirely automatic, and thus requires a minimum of manual labor in connection with the manufacture of the articles.

A still further object is the provision of an apparatus for forming hat covers or the like so that a number of the articles are produced at one time.

A still further object is the provision of an apparatus for automatically forming hat covers or the like in which all movements of the apparatus are positively interrelated, thereby making it impossible for any portion of the production cycle to get out of phase with the other portions thereof.

These and other objects and advantages will become more apparent upon reference to the following description taken in connection with the accompanying drawings, in which:

Figure 1 is a side elevation of a machine according to this invention;

Figure 2 is a view like Figure 1 but looking in at the opposite side of the machine;

Figure 3 is a transverse vertical section through the machine indicated by lines 3—3 on Figures 1 and 2;

Figure 4 is a detailed sectional view indicated by line 4—4 on Figure 3;

Figure 5 is an enlarged view of a portion of Figure 3 showing some of the construction thereof somewhat more in detail;

Figure 6 is a longitudinal section along the machine as indicated by line 6—6 on Figure 3;

Figure 7 is a cross section through the machine indicated by lines 7—7 on Figures 1, 2, and 6;

Figure 8 is a fragmentary view showing a detail in connection with Figure 7;

Figure 9 is an enlarged view showing the parts of the machine in the position they occupy after having completely formed a hat cover;

Figure 10 is a sectional view indicated by line 10—10 on Figure 3 showing one of the cams of the machine and the part which it operates;

Figure 11 is a view showing the operation of another part of the machine;

Figure 12 is a fragmentary view showing still another cam and the part which it operates;

Figure 13 is a transverse sectional view indicated by line 13—13 on Figure 6;

Figures 14 and 15 are enlarged detail views of a portion of the mechanism shown in Figure 13; and Figure 16 is a view showing a cutter knife by means of which the blanks that form the hat covers are cut from the film of material fed into the machine.

Referring to the drawings somewhat more in detail, the machine of this invention comprises a frame having side plate members 10 and 12 which are supported by the legs 14 to position the mechanism at its proper height. Mounted in the frame is a multiple station die and a multiple station forming member which are utilized for forming a film or thin sheet of material to the desired shape.

The multiple station die will best be seen in Figures 3 through 6 and 9, and comprises a generally rectangular frame part 16 having end members 18 which are keyed to hollow shafts 20 that are journaled in bearings 22 that are mounted in the side plates 10 and 12 of the machine frame.

Each face of rectangular frame part 16 is provided with a pair of spaced generally elliptical apertures 24 which form the die part within which the hat cover is formed. Each face of the rectangular frame part 16 is likewise provided with a groove 26 which extends about the aperture 24 and which provides a cutting edge for cooperation with a knife to be described hereinafter for cutting out blanks of material of the proper size from the sheet being fed through the machine.

Mounted on the shaft 20 that extends through side plate 12 and externally of the frame of the machine is a Geneva wheel 28. This Geneva wheel will best be seen in Figures 2 and 3 and comprises a four-position mechanism having slots 30 engageable by a roller on the end of an arm 32 in a substantially conventional manner which is connected with the usual locking member 34 and keyed to a shaft 36.

Shaft 36 mounts a sprocket 38 over which passes drive chain 40 that leads over a sprocket mounted on the output shaft of a geared head electric drive motor 42. It will be apparent that operation of motor 42 to drive chain 40 in the direction indicated by the arrow in Figure 2 will cause rotation of locking member 34 and arm 32 in the direction indicated by the arrow thereon, and this will bring about the intermittent indexing of Geneva wheel 28 and the shaft to which it is keyed in steps of ninety degrees in the direction indicated by the arrow on the Geneva wheel.

The sheet of material that is to be formed into the hat covers is mounted on a roll 44 which will be seen at the left end of Figures 2 and 6 and at the right end of Figure 1. This roll is supported on any suitable projecting bracket means, as at 46, which support a shaft 48 that also has thereon a friction drum 50 over which passes a flexible band 52 anchored at 54 and held under tension by a weight 56. This arrangement is such that the roll 44 will not overrun because of the intermittent movement of the rectangular forming die, and so that a predetermined tension is always maintained on the material as it passes through the machine.

The strip of material to be formed is indicated by the dot-dash line 58, and it will be seen that in leaving roll 44 the strip passes over the fixed idler rollers 60 between which is floatingly mounted a third idler roller 62, spring tensioned by spring 64 to maintain a substantially constant tension in the strip 58. Strip 58 then passes over the top of the rectangular die of the machine, down the front face thereof, and then over another fixed idler roller 66.

From idler roller 66 the strip passes about a driven waste roll 68 mounted on shaft 70 and against which bears the idler roll 72 mounted on the end of an arm 74 pivoted at 76 and biased by a weight 78 on the opposite side of the pivot from the said idler roll. This arrangement for disposal of the waste is such that the waste roll 68 can be adjusted always to overfeed, thereby preventing any slack in the strip of material during its passage through the machine, but with the cooperation of the idler roll 72 the said strip can slip on the periphery of the waste roll, thereby preventing the overfeeding of the strip from causing it to rupture.

Turning back to Figure 2, the shaft 70 on which the waste roll 68 is mounted extends through the side plate 12 and mounts a sprocket 80 over which passes a chain 82 that leads to a sprocket 84 mounted on the shaft 20 that is driven by Geneva wheel 28. A pair of idler sprockets 86 may be provided for guiding the chain 82 in its travel between sprockets 80 and 84. It will be apparent that the waste roll 68 is only driven during the time that the Geneva wheel is driven and the rectangular die element is indexing.

It will also be evident that the overfeeding characteristic of the waste roll as described is also necessary to compensate for the nonuniform peripheral speed of the die member during its rotation by the Geneva wheel.

The double station die or forming member will best be seen in Figures 6, 7, and 9. This member comprises a single supporting shaft 100 having its ends journaled in the bearings 102 that are positioned within the generally rectangular blocks 104. The blocks 104 are provided with grooves 106 on their top and bottom faces which fit over guide rails 108 mounted on plates 110 that extend along the top and bottom parts of slots 112 formed in the side plates 10 and 12 of the machine frame.

Mounted on shaft 100 are two hub members 114, and extending outwardly from the hub members are a plurality of rods 116 threaded at one end to the hub member as by the lock nuts 118 and threaded at the other ends for adjustably receiving the shaped forming members 120. The forming members are preferably of relatively thin material and have mounted therein heating elements, as at 122, adapted for being supplied with electric current by cable 124 and having the supply of energy controlled in a substantially conventional manner as by a thermostat 126.

As will be seen in the several views illustrating the multiple station forming member, there are two banks of the forming members 120, and each bank consists of four of the forming members located ninety degrees apart about the shaft 100. The forming members are spaced so as to register with the apertures 24 of the rectangular die member.

Inasmuch as the forming members and the shaft on which they are mounted rotate, the several electric cables 124 may be connected to the slip rings 128 mounted in the insulating block 130 that rotates with the forming members. Electric power is conducted to the slip rings by the brush arrangements 132 that are mounted in a frame or enclosure 134 that is stationary so far as rotation is concerned, so that a power cable, as at 136, can be brought therein and connected to the said brushes. In this manner there is a supply of electric current continuously available for the several heating elements 122 so the said elements become energized at any time the associated thermostat indicates the necessity therefor.

The mounting of the multiple station forming member in the bearing blocks 104 with the bearing blocks slidable in the frame of the machine is for the purpose of advancing the forming members into engagement with the die of the machine so that the strip of material passing around the die will be formed by the forming members. For so reciprocating the multiple station forming member in the frame of the machine there are a pair of collars 140 on the shaft 100 to which are connected the drag links 142 that connect by means of the clevises 144 to the upper ends of a pair of arms 146 that are mounted on a shaft 148 journaled in the side plates 10 and 12 of the machine frame.

This arrangement will best be seen in Figures 1, 6, 7, and 11. The shaft 148 externally of the side plate 10 of the machine frame, and which is on the opposite side of the machine from the drive motor 42 and the Geneva mechanism for the die of the machine, carries an arm 150. The upper end of arm 150 is connected by a clevis 152 to a drag link 154 which extends to and is pivotally connected with a rotary cam 156 mounted on the end of shaft 36 opposite the connection of the said shaft with the arm 32 and locking plate 34 of the aforementioned Geneva mechanism.

Reference to Figures 1 and 11 will serve to reveal that rotation of the cam 156 will cause oscillation of arm 150 between the dotted line positions indicated, and that this, in turn, will oscillate shaft 148 and arms 146 so as to reciprocate the drag links 142 and the multiple station forming elements. It will also be noted that the position which cam 156 occupies on shaft 36 is such that the major part of the travel of the multiple station forming member takes place during the two hundred and seventy degrees of rotation of shaft 36 during which the Geneva mechanism is idle. The ninety degrees during which the Geneva mechanism is active for indexing the die is that portion of the rotation of cam 156 during which the multiple station forming member is in its rearmost position.

For indexing the multiple station forming member the drive, which will best be seen in Figures 1, 3 and 7, is utilized. In these figures it will be noted that there is mounted on the end of the shaft 20 of the die member on the side of the machine opposite of the Geneva mechanism, a miter gear 160 which meshes with another miter gear 162 secured to the end of a shaft 164 extending rearwardly along the side of the side plate 10 of the machine frame. Shaft 164 has its ends journaled in bearing elements 166 secured to the machine frame and is longitudinally splined, as indicated at 168, for slidably mounting the miter gear 170 that is journaled in the journal box 172 secured to the adjacent bearing box 104 for the rotary multiple station forming member.

It will be evident that reciprocation of the forming member in the manner previously described will be accompanied by reciprocation of gear 170 along shaft 168 with the said gear and shaft remaining in driving engagement.

Miter gear 170 meshes with another miter gear 174 that is secured to the end of shaft 100 so that this shaft is drivingly connected through the miter gears 170 and 174, shaft 168, and miter gears 160 and 162 with shaft 20 of the die member. In this manner each indexing movement of the die member is accompanied by an equal indexing movement of the forming member to bring another set of the forming elements into register with the face of the die member which is brought to working position by the said indexing movement.

As will be brought out hereinafter, the formed articles retract from the forming station with the forming member, and the indexing of the forming member carries the formed pieces out of forming position toward a position to be removed from the associated forming elements.

In the forming of the articles according to this invention, there is first cut from the strip of material a blank which is to be formed and the periphery of this blank is held by a blankholder platen during the forming operation. This portion of the device is best illustrated in Figures 6, 9, 12, and 13, through 16. The blanking and blankholding mechanism consists of a support plate 180 extending transversely between the side plates 10 and 12 of the machine frame. Slidably mounted in each of the slots 112 extending along the sides of the machine frame to be guided by the rails 108 therein, are blocks 182 which loosely receive the pins or studs 184 projecting from the ends of plate 180.

By this arrangement the plate is floatingly supported and will accommodate itself to minor irregularities encountered in the surface of the die member so as to have a good bearing thereover at all times.

The plate 180 is provided with spaced apertures 186 which register with the apertures 24 in the die member and permit entry of the forming elements into the apertures in the die member to form the strip being treated.

The plate 180 has resiliently mounted thereon the blankholder means, indicated at 188, and which are urged outwardly from plate 180 by springs 190 and retained in position on the plate by the bolts 192.

For shearing off, the blank plate 180 mounts a pair of cutting members 194 which are so positioned that they cooperate with the outer peripheries of the grooves 26 surrounding each of the apertures in the die. These knives or shearing elements may be in the form of a sharp knife blade, may be spirally formed so that a progressive cutting action obtains, or may otherwise be irregularly shaped, as, for example, according to a serrated pattern, as indicated at 196 in Figure 16.

For reciprocating plate 180 to and from working position there is pivotally connected to each end thereof a link 198 extending backwardly toward the die of the machine, and each link is pivotally connected at its rear end, as at 200, to the upper end of an oscillatory arm 202. Arms 202 are pivoted at 204 to the machine frame, and each carries a roller 206 bearing against the periphery of a cam 208 mounted on shaft 36. Cams 208 rotate in the direction indicated by the arrow in Figure 6 and are arranged to cause a quick advancing movement of plate 180 so that it engages the face of the die prior to the forming elements engaging the strip being worked.

Thereafter, the cams 208 cause retraction of plate 180 to the position which it occupies in Figure 6. As with the indexing forming elements, the plate 180 is in its retracted position during the indexing movement of the die. For resiliently urging plate 180 toward the die springs 210 are preferably provided. In this manner the cams 208 merely provide the means for retracting the plate from working position and for permitting it to be resiliently advanced into working position.

It has been previously mentioned that the strip or sheet of material being formed is heat softenable, and in order to obtain a proper drawing or stretching action of the material, it is necessary for it to be preheated to substantially the proper working temperature. After being heated to working temperature, the heat of the forming elements will maintain it at that temperature throughout the working cycle.

For preheating the strip of material there is a preheating station provided at the upper face of the indexing die station, so that the strip is preheated immediately prior to its movement into working position.

This portion of the machine will be seen in Figures 1, 2, 3, 9 and 10, and comprises a pair of anvils 220 positioned inside the hollow die member and carried on a plate 222 that is mounted on the upper ends of four spaced rods 224 that have their lower ends extending through bars 226, all as will be seen best in Figures 3, 4, and 9.

Springs 228 are mounted about rods 224 and serve to thrust support plate 222 toward its uppermost position. Bars 226 are rigidly secured to a transversely extending channel 230, and extending upwardly from each bar inside the head parts 18 of the die are a pair of bars 232. Bars 232 are secured to the inner ends of hollow shafts 234 that extend through shafts 220 to have their outer ends secured to the support elements 236 that form portions of brackets 238 that are rigidly mounted on the machine frame.

At the inner ends of shafts 20 there may be provided the bearings 240, and the arrangement is such that shafts 20 and the die member supported thereon are rotatable, whereas the shafts 234 and the parts connected thereto are held stationary.

In alignment with the ends of hollow shafts 234 upstanding bars 232 are apertured and mount a frame 242 having therein a plurality of guide rollers 244. These guide rollers are for the purpose of guidingly supporting the cables 246 that have their one ends connected to support plate 222 to extend therefrom over the said guide rollers and out from hollow shafts 234 into engagement with guide pulleys 248 carried on brackets 238. The cables 246 then extend upwardly and are connected with a structure externally of the die member which comprises a transversely extending plate 248a.

As will be seen hereinafter, the described arrangement is provided so that when plate 248 moves downwardly cable 246 will be permitted to feed into the die element and thereby permit springs 228 to move support plate 222 upwardly and bring anvils 220 into engagement with the lower surface of the strip of material extending across the top of the die member.

Plate 248a has floatingly supported therebeneath, as by the pin and slot arrangement 249, a frame 250 that comprises a pair of platen elements 252 adapted for being heated by the heating elements 254, which may have electric current supplied therethrough, as by the cable 256. The temperature to which the platens 252 are raised may readily be controlled in a conventional manner by the thermostats 258, as seen in Figure 3.

Plate 248a at its opposite ends is connected to rods 260 that extend vertically downwardly through spaced guide blocks 262 carried on the side plates 10 and 12 of the machine frame. There are two of the rods 260 at each end of plate 248a, as will be seen in Figures 1, 2 and 10.

At their lower ends the rods 260 are interconnected by block 264 which is pivotally connected by link 266 to the end of one arm of an oscillatory bell crank 268 pivoted to the machine frame, as by the shaft 270. The end of the other arm of the bell crank 268 has a roller 272 that engages cam slot 274 in the cam 56 that is mounted on shaft 36, as previously described. The cam slot 274 is arranged so that the plate 248a will be moved from the retracted position in which it is illustrated in Figure 3 to the advanced position in which it is illustrated in Figure 9, and, in this manner, the strip that is passing through the machine has the areas thereof which are to be formed or stretched preheated to the proper temperature immediately before they are moved into working position.

The extent of the area so preheated and the particular configuration of the area can be determined by experiment for each type of workpiece, and, in some cases, the entire area will be raised to working temperature, while, in other cases, only a certain portion thereof will be heated. Likewise, should conditions indicate the necessity thereof, different areas of the strip could be heated to different temperatures in order to vary the workability of different portions.

*Operation*

In order to make clear the cycle which obtains in the forming of hat covers in accordance with this invention, a cycle of operation will now be described.

Assuming that a roll of the material to be worked is in position, and that the strip is threaded through the machine in the manner illustrated in Figure 6, the machine may be set in operation by energizing motor 42. Assuming that the Geneva mechanism is in the position shown in Figure 2, then the other parts of the machine will occupy the positions in which they are illustrated in Figures 1 and 6. With the parts in this position, an indexing movement of both the die member and the forming member has just taken place, and the portion of the strip being worked that is now in working position has been preheated to working temperature.

Continued operation of the machine now causes shaft 36 to turn in a counterclockwise direction, as viewed in Figure 6, and a clockwise direction as viewed in Figure 1. This described movement of shaft 36 moves cams 208 to a position where they release arms 202 to the influence of springs 210, which moves the shearing and blankholding mechanism into engagement with the working face of the die member, thereby shearing off the two blanks which are to be formed and gripping their peripheries.

The shearing and blankholding device is shown in its inner position in Figures 9 and 13.

Rotation of cam 156 in the manner described will cause movement of drag link 154, arm 150, shaft 148, arms 146, and drag links 142 in a direction to carry the forming member into its fully advanced position, as illustrated in Figure 9.

During the advancing movement of the forming member, the cam slot 274 in cam 156 cause rocking of bell crank 268 in a direction to pull plate 248a downwardly, thereby to cause platens 252 to approach the upper surface of the strip of material that is extending over the top of the die member. Simultaneously with lowering movement of the said platens, the anvils 220 move upwardly and approach the lower surface of the said strip. The platens and anvils thus engage opposite sides of the strip, as illustrated in Figure 9, and due to the heated condition of the platens cause the strip to be preheated to working temperature.

Continued operation of the drive motor will cause cam 156 to bring about retraction of the shearing and blankholding device by reason of the gradual rise on cams 208. At least the initial retracting movement of the shearing and blankholding device takes place prior to the initiation of the retraction of the forming member, so that, when the said forming member retracts, the periphery of the blank which it has formed is released, and the formed article remains on the forming element, by which it has been shaped.

During the retracting movement of the shearing and blankholding device into the forming member, the cam slot 274 in cam 156 again acts through bell crank 268 to raise the platens 252 while simultaneously lowering the anvils 220.

As the shearing and blankholding devices, the forming member, and the preheating elements approach their fully retracted position, the Geneva mechanism again becomes operative for indexing of the die member, the forming member is indexed through its geared connection with the die member and the waste roll 68 is driven by means of its chain connection with the die member. Indexing of the die member will bring the preheated portion of the strip of material being worked into working position; operation of the waste roll maintains tension on the strip; and indexing of the forming member brings another pair of forming elements into register with the die member.

The formed work members can be removed from the forming elements at any convenient time before the elements again reach working position and may be stripped from the elements automatically by means of an air jet or other suitable ejecting means, if desired.

It will be understood that this invention is susceptible to modification in order to adapt it to different usages and conditions, and, accordingly, it is desired to comprehend such modifications within this invention as may fall within the scope of the appended claims.

I claim:

1. In an apparatus of the type described: a hollow die member having peripherally spaced die openings therein, shafts supporting said member, means for indexing said member to present successive of the openings to a work axis, a unit non-rotatably mounted inside said member having a flat element smaller than the die opening spaced inwardly from the die opening next to be moved into working position, another substantially flat element spaced outwardly from said opening, and means for moving said elements toward each other to engage opposite sides of a strip of material over the said opening, said elements engaging the material without moving it out of position over the opening, at least one of said elements being heated.

2. In an apparatus of the type described: a hollow die member having peripherally spaced die openings, hollow shafts supporting said member, a unit inside said member comprising a frame and a first flat element smaller than the die opening mounted thereon for movement toward and away from the periphery of the die member, support rods connected to the frame and extending through the hollow shafts to hold the said frame rigid, a second flat element outside the die member aligned with said first element, and means interconnecting said elements for simultaneous movement thereof toward and away from each other, at least one of said elements being heated, said elements approaching each other in parallelism toward a final position in the plane of the die opening of the die member.

3. In an apparatus of the type described; a hollow die member having a plurality of peripherally spaced die openings therein, shaft means rotatably supporting said die member, drive means for periodically indexing said member to present said openings in succession to a work axis, a unit non-rotatably mounted inside said member having an element smaller than said die openings spaced inwardly from the inner surface of the die member sufficient to permit indexing movement of the die member, said element being aligned with the die opening next to be moved into working position, another element external of said die member spaced outwardly from the last-mentioned die opening sufficient to permit indexing movement of the die member, means connecting said elements for simultaneous movement thereof toward and away from each other, at least one of said elements being heated, said elements approaching each other toward the final position where they engage a web of material passing around said die member in the plane of the said opening with which the elements align, and means drivingly connecting said drive means with one of said elements for moving said elements first toward and then away from each other in the interval between successive indexing movements of said die member.

4. In an apparatus of the type described; a hollow die member having peripherally spaced die openings therein, shaft means supporting said die member, said die member indexable for presenting the openings therein successively to a work axis, a unit mounted inside said die member comprising an element smaller than the die openings and spaced inwardly from the die opening next to be moved into working position, a second element external of said die member spaced outwardly from said last-mentioned opening, means connecting said elements for simultaneous movement toward and away from each other with the elements being engageable with each other in the plane of said die opening, at least one of said elements being heated, a Geneva wheel connected with the shaft means for said die member, a continuously rotating drive arm for said Geneva wheel, cam means connected with said drive arm, and means operated by said cam means for effecting actuation of said elements toward each other and then away from each other between intervals of movement of said Geneva wheel.

References Cited in the file of this patent

UNITED STATES PATENTS

| | | |
|---|---|---|
| 1,181,964 | Bohlman | May 2, 1916 |
| 1,738,046 | Elton et al. | Dec. 3, 1929 |
| 1,760,288 | Stevens | May 27, 1930 |
| 2,058,880 | Hunt | Oct. 27, 1936 |
| 2,229,613 | Strauch | Jan. 21, 1941 |
| 2,255,116 | Helmstaedter | Sept. 9, 1941 |
| 2,260,667 | Hoof | Oct. 28, 1941 |
| 2,287,675 | Fair et al. | June 23, 1942 |
| 2,295,066 | Weikert | Sept. 8, 1942 |
| 2,296,723 | McClurg et al. | Sept. 22, 1942 |
| 2,298,077 | Witter | Oct. 6, 1942 |
| 2,304,629 | Emmer | Dec. 8, 1942 |
| 2,332,792 | Gross et al. | Oct. 26, 1943 |
| 2,377,392 | Wiley | June 5, 1945 |
| 2,378,642 | Kopplin | June 19, 1945 |
| 2,403,482 | Cloud | July 9, 1946 |
| 2,429,960 | Piperoux et al. | Oct. 28, 1947 |
| 2,476,219 | Purinton | July 12, 1949 |
| 2,505,997 | Sisson | May 2, 1950 |
| 2,521,388 | Maynard et al. | Sept. 5, 1950 |
| 2,549,123 | Osterhof | Apr. 17, 1951 |
| 2,615,200 | Cloud | Oct. 28, 1952 |